US00RE43173E

(19) United States
(12) Reissued Patent
Ambuske et al.

(10) Patent Number: US RE43,173 E
(45) Date of Reissued Patent: Feb. 14, 2012

(54) HELMET WITH IN-MOLD AND POST-APPLIED HARD SHELL

(75) Inventors: Aaron Ambuske, Seattle, WA (US); Andrew Logan, Newbury Park, CA (US); Scott McManigal, Pacific Palisades, CA (US)

(73) Assignee: K-2 Corporation, Seattle, WA (US)

(21) Appl. No.: 12/722,898

(22) Filed: Mar. 12, 2010

Related U.S. Patent Documents

Reissue of:
(64) Patent No.: 7,475,434
Issued: Jan. 13, 2009
Appl. No.: 11/003,928
Filed: Dec. 3, 2004

U.S. Applications:
(60) Provisional application No. 60/527,452, filed on Dec. 5, 2003.

(51) Int. Cl.
*A42B 3/00* (2006.01)
(52) U.S. Cl. ..... 2/425
(58) Field of Classification Search ..... 2/6.3, 6.7, 2/410–412, 422, 425
See application file for complete search history.

(56) References Cited

U.S. PATENT DOCUMENTS

| | | | | |
|---|---|---|---|---|
| 4,141,084 | A | 2/1979 | Krieger | |
| 4,141,085 | A * | 2/1979 | Adams, Sr. | 2/410 |
| 4,172,455 | A * | 10/1979 | Beaussant | 128/201.23 |
| 4,656,667 | A * | 4/1987 | Blake | 2/5 |
| 4,995,117 | A * | 2/1991 | Mirage | 2/410 |
| 4,996,724 | A * | 3/1991 | Dextrase | 2/411 |
| 5,010,598 | A * | 4/1991 | Flynn et al. | 2/410 |
| 5,351,342 | A * | 10/1994 | Garneau | 2/414 |
| 5,734,994 | A * | 4/1998 | Rogers | 2/411 |
| 5,915,537 | A * | 6/1999 | Dallas et al. | 2/410 |
| 5,937,446 | A * | 8/1999 | Fallert | 2/412 |
| 6,009,561 | A * | 1/2000 | Bullock et al. | 2/422 |
| 6,119,276 | A * | 9/2000 | Newcomb et al. | 2/425 |
| 6,247,186 | B1 * | 6/2001 | Huang | 2/410 |
| 6,711,751 | B1 * | 3/2004 | Muskovitz | 2/410 |
| 7,069,601 | B1 * | 7/2006 | Jacobsen | 2/421 |
| 2002/0104153 | A1 * | 8/2002 | Benedict et al. | 2/424 |
| 2005/0241049 | A1 * | 11/2005 | Ambuske et al. | 2/412 |

OTHER PUBLICATIONS

"Monolithic," Webster's New Twentieth Century Dictionary, Unabridged 2d ed, p. 1163.
Third-Party Communication from Edward W. Bulchis of Dorsey & Whitney LLP regarding analysis of U.S. Pat. No. 7,475,434, dated Jan. 23, 2009, 17 pages.

* cited by examiner

*Primary Examiner* — Shaun R Hurley
(74) *Attorney, Agent, or Firm* — Christensen O'Connor Johnson Kindness PLLC

(57) ABSTRACT

The invention is related to a helmet having an interior foam liner with at least two shell portions. The helmet includes an exterior in-mold shell portion covering a portion of the liner. The helmet also includes an exterior post-applied shell portion covering a portion of the liner that is not covered by the in-mold shell portion. The helmet includes conduits located between the liner and the post-applied shell portion for ventilation and air flow useful for removing the heat generated by a user.

28 Claims, 5 Drawing Sheets

HELMET WITH IN-MOLD AND POST-APPLIED HARD SHELL

Matter enclosed in heavy brackets [ ] appears in the original patent but forms no part of this reissue specification; matter printed in italics indicates the additions made by reissue.

CROSS-REFERENCE TO RELATED APPLICATION

This application claims the benefit of provisional U.S. Application No. 60/527,452, filed on Dec. 5, 2003, incorporated herein expressly by reference.

FIELD OF THE INVENTION

The invention is related to a helmet having an outer shell, wherein the shell is constructed from an in-mold shell portion and a post-applied shell portion, and to the method of making the helmet.

BACKGROUND OF THE INVENTION

Conventional helmets typically include a hard exterior shell and a foam liner interior to the shell. There are two widely-used methods of making a helmet with a liner and shell. In one method, the hard outer shell and the foam liner are both made independently of each other. Thereafter, the shell is applied to the liner with glue, rivets, screws or is otherwise attached by physical means. As used throughout this application, "post-applied shell" refers to a shell or shell portion attached to the foam liner, after the foam liner has been pulled from the mold, and such technique is referred to as the "post-applied method." In a second method, the helmet's hard outer shell is bonded to the helmet's inner foam liner simultaneously with the formation of the liner. The liner is cast with the shell in the mold. The liner material, typically polystyrene, is injected into the mold containing the hard outer shell. As used throughout this application, "in-mold shell" refers to a shell or shell portion that is bonded to the foam liner at the time of formation of the foam liner, and such technique is referred to as the "in-mold method." The advantage with the latter method is that the in-mold method results in a sturdier attachment between the shell and the liner that can prevent separation of the shell from the liner under a severe impact. The former method, however, is not without advantages.

While the in-mold method has a distinct advantage in strength, the post-applied method also has an advantage that cannot be fully realized in a helmet with an in-mold shell. For example, independently forming the liner and the shell, and thereafter, attaching the shell to the liner, after formation of the liner, permits the creation of channels on the exterior surface of the liner (i.e., the surface facing the shell). Thus, when the shell and liner are brought together, the channels on the liner are converted into conduits between the shell and liner that are useful for providing ventilation. Air flow between the shell and the liner is not possible with a helmet having an in-mold shell, since all the interior surfaces of an in-mold shell are covered with the foam liner as a result of the method used.

Accordingly, there is a need to provide a sturdy in-mold shell helmet with the ventilation advantages of a post-applied shell helmet. Alternatively, there is a need for a sturdy shell to liner attachment in a post-applied shell helmet. The present invention fulfills these needs and has further related advantages.

SUMMARY OF THE INVENTION

The present invention is related to a helmet having an interior foam liner and at least two shell portions exterior to the liner. The helmet includes an exterior in-mold shell portion covering a portion of the liner. The helmet also includes an exterior post-applied shell portion covering a portion of the liner that is not covered by the in-mold shell portion. In one embodiment, the in-mold shell portion comprises polycarbonate and the post-applied shell portion comprises poly (acrylonitrile-butyl-styrene). The helmet includes conduits located between the liner and the exterior post-applied shell portion for ventilation and air flow for removing the heat generated by a user. The liner is made with channels and through-bores that form the various air entry and exit points and the conduits of the helmet. The exterior post-applied shell portion includes holes and vent fins to assist in the entry, exit, and direction of the air flow through the conduits.

A method of making a helmet having a liner and a shell includes placing a first shell portion in a mold and making a casting of a foam liner to provide a liner with an in-mold shell portion bonded to the liner and partially covering a portion of the liner that is desired to have a sturdy attachment between the in-mold shell and the liner. After removing the liner from the mold, the method includes attaching a second shell portion to the liner portions that are not covered by the in-mold shell portion. Because the liner has been provided with channels and through-bores, the application of the post-applied shell portion results in conduits and entry and exit points for the air that are created from the post-applied shell portion and the liner.

The helmet made in accordance with the invention provides numerous advantages, including the ability to provide ventilation between the shell and the liner where ventilation is important, but also provides a structurally stout attachment between the shell and the liner where the integrity of the shell and liner attachment is important or alternatively, where ventilation is unimportant.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
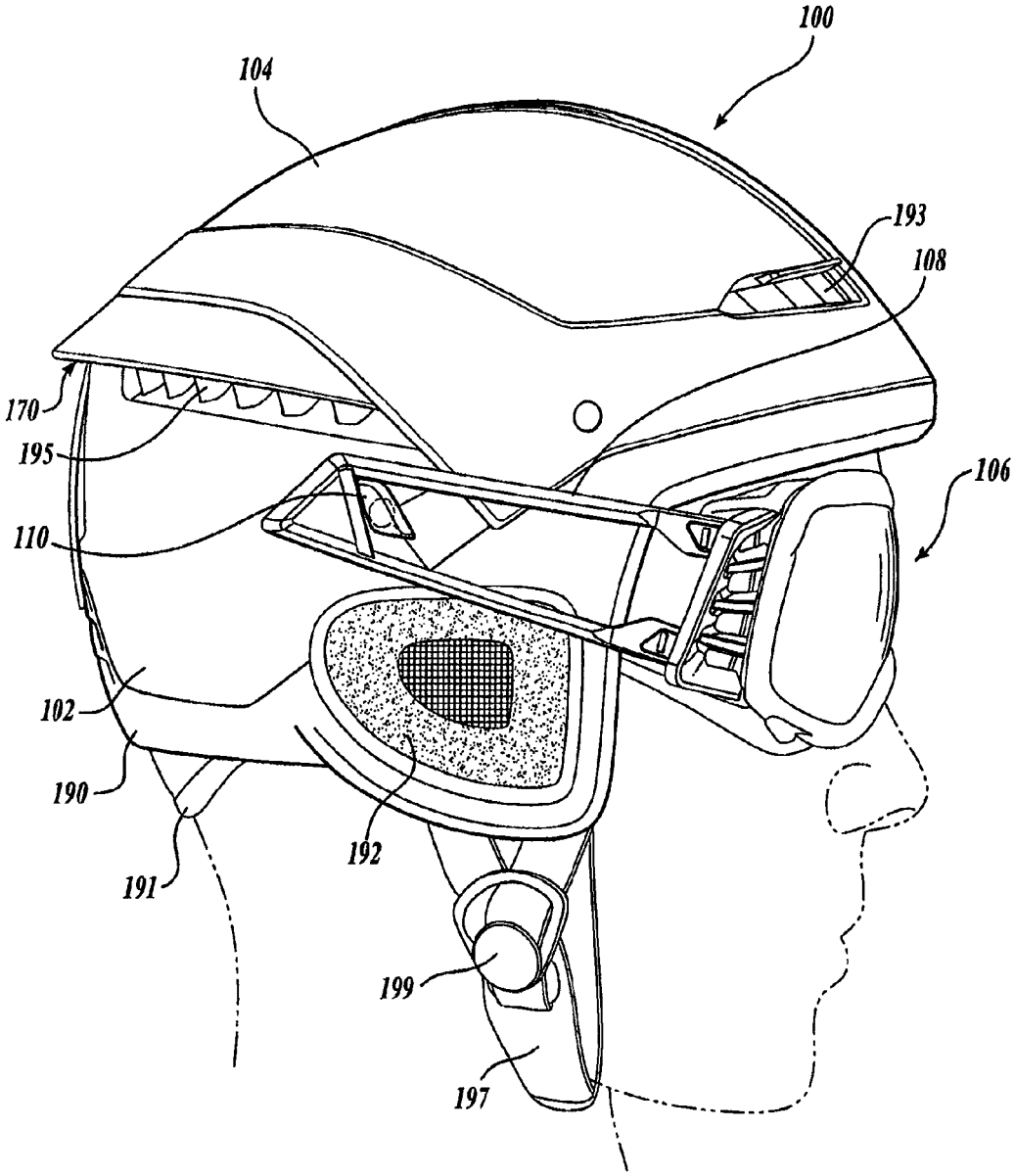
FIG. 1 is an illustration of a helmet according to the present invention.

Generally, helmets include an interior shock absorbent liner made from a material capable of being foamed, such as polystyrene, polyurethane, or other similar materials, and an exterior hard shell made from materials, such as polycarbonate and poly(acrylonitrile butadiene-styrene) (ABS).

A first conventional method of producing a liner with a shell includes casting the foam liner with the entire shell in the mold. After curing, the foam liner is pulled from the mold with the in-mold shell integrally bonded to the foam liner. Additionally, other helmet components besides the entire shell can be cast with the foam liner to integrally embed the helmet components in the liner. In the in-mold method, all interior surfaces of the shell are exposed to the foam and are, therefore, bonded to the foam liner. The in-mold method leaves no spaces between the interior surface of the shell and the foam liner, thereby providing a very sturdy attachment that can withstand a severe impact. However, the advantage of the in-mold method also results in a helmet that cannot be provided with venting between the shell and the liner for the very reason that all interior surfaces of the shell are fully covered by the foam. Venting between the shell and the liner is desirable in some instances for increasing the rate of heat removal from the body.

A second conventional method of producing a liner with a shell includes manufacturing the liner and the entire shell independently of one another and then bonding or otherwise attaching the entire shell to the liner with an adhesive or through the use of rivets, screws or other hardware. The liner is typically made by injecting or pouring polystyrene granules inside of a mold and allowing the polystyrene to expand to the shape of the mold. A mold release can be applied to the mold surface, prior to casting the liner for separating the liner from the mold. The positive mold can be provided with any number of ridges and protrusions, which result in channels and through-bores in the negative foam liner casting that is removed from the mold. Once the foam liner is removed from the mold, the shell can be bonded to the foam liner.

In the post-applied method, it is not necessary that the shell have the exact contours of the foam liner. If venting is desired between the shell and liner, it is advantageous that the shell does not have the exact contours so that conduits can be formed between the shell and the liner out of the channels in the liner to allow for airflow therein. In direct contrast to the post-applied method for making a helmet, the in-mold method of making a helmet is not suitable for creating spaces for air flow between the shell and the liner. This is because the in-mold method exposes all the interior surfaces of the shell to the foam liner. While it is possible to put apertures that extend through both the shell and the liner in an in-mold helmet, it is not possible to provide channels for airflow between the shell and the liner. In some instances, apertures that extend through both the shell and the liner are insufficient to remove the heat generated by a user.

According to the present invention, a helmet with a liner is provided that has at least one in-mold shell portion and at least one post-applied shell portion. The advantages of each shell type can be exploited by locating the post-applied shell portion or portions where ventilation between the shell and liner is desired, for example, at the coronal or frontal areas of the helmet. The coronal area is desirable because heat rises, and the frontal area is desirable because air impacts the front of the helmet. The in-mold shell portion or portions can be applied to the remainder of the liner not covered by the post-applied shell or where ventilation is of relatively minor importance. Alternatively, the in-mold shell portion or portions can be applied to the areas where a sturdy attachment between shell and liner is desired to protect the most sensitive areas of the head. In one embodiment of the invention, for example, an in-mold shell portion can be applied at the occipital area of the helmet because air does not impact the helmet in the occipital area as compared with the frontal or coronal area. It is also possible to have overlapping portions at the boundaries of the in-mold and post-applied shell portions. One or more in-mold shell portion or portions and one or more post-applied shell portion or portions can be applied to the helmet. In other embodiments, it is possible that the in-mold shell portion can be applied at other locations besides the occipital area. For example, the in-mold shell portion can be applied to the temporal, frontal or coronal areas of the helmet. Besides a monolithic in-mold shell portion, more than one in-mold shell portion can be applied to any one or more portions of the liner. Similarly, the post-applied shell portion can be a monolithic shell portion, or alternatively, post-applied shell portions can be applied at distinct areas of the liner. Generally, terms such as occipital (back), coronal (top), temporal (side) and frontal (front) denote areas of the skull, as used herein however, the terms are used to denote areas on the liner, shell or helmet that are in proximity to these corresponding areas of the skull. It is to be appreciated when referring to locations that designations such as occipital, temporal, coronal, and frontal give only approximate locations. Also, directions, such as upper, lower, bottom or side, are to be taken in the context of the application figures and are not limiting.

Referring now to FIG. 1, a helmet 100 according to the present invention, is illustrated, wherein the helmet 100 may include an in-mold shell portion 102 at the occipital area of the helmet 100, and a post-applied shell portion 104 at the coronal area of the helmet. The post-applied shell portion 104 may also extend to the frontal and temporal areas of the helmet 100. In-mold shell portion 102 may extend into the temporal areas as well. Protective eyewear 106 is shown with the helmet 100 and the eyewear 106 is attached by band 108 to a post 110 on the side of the helmet 100 at the temporal area. Goggles, suitable as eyewear 106 is described in U.S. patent application Ser. No. 11/003,929, filed on Dec. 3, 2004, titled "Banded Goggles for a Winter Sports Helmet." This application is expressly incorporated herein by reference. While the eyewear 106 and helmet 100 can be made to be used as a set, it is not necessary that the helmet 100 be made specifically for use with eyewear 106. The helmet 100 can be made with or without the post 110. The helmet 100 may include accessory helmet components, such as ear muffs 192, plastic trim 190, interior padding 191, such as textile covered foam and textile mesh, front and rear vents 193, 195, chin strap 197, and chin strap buckle 199.

Figure 2:
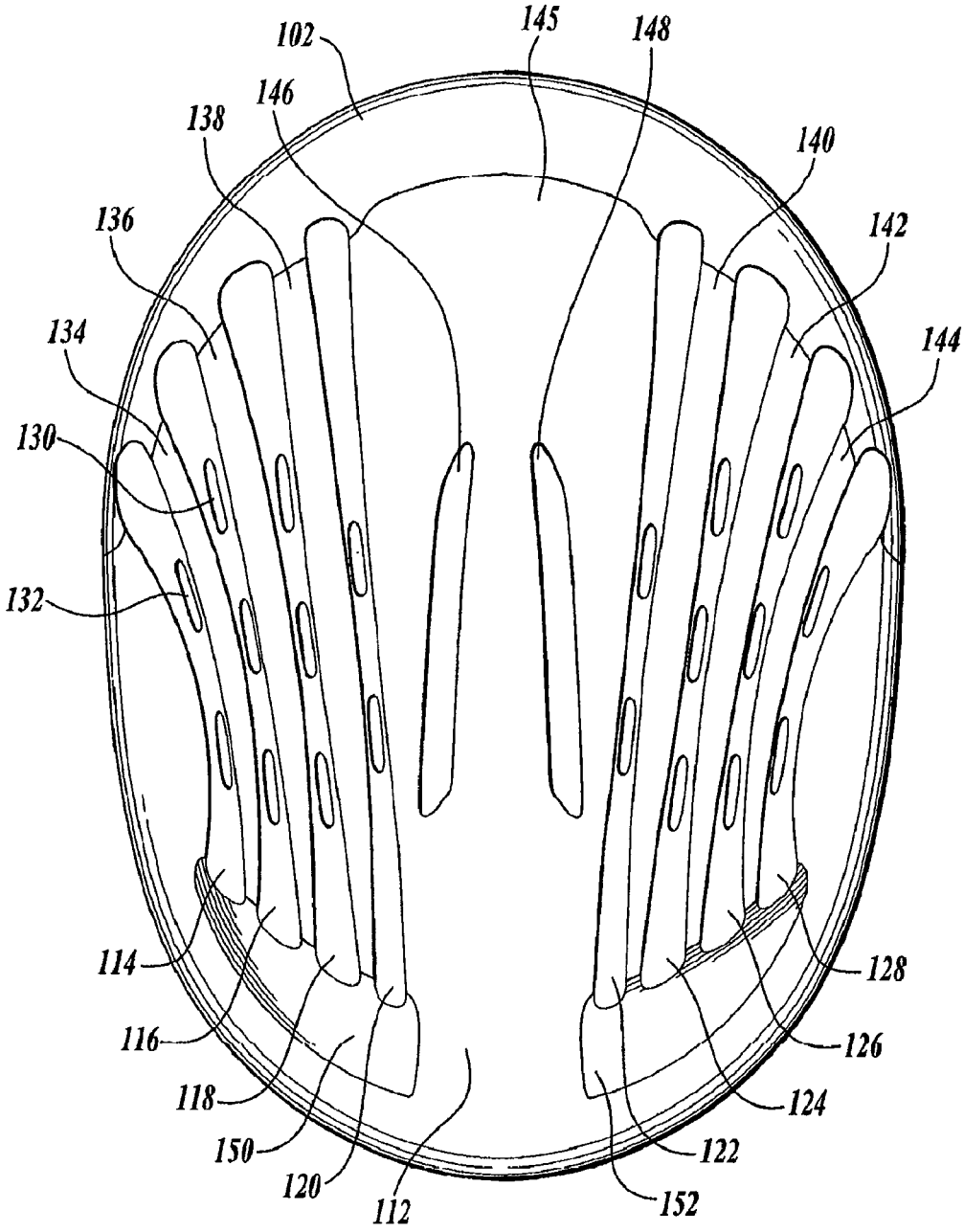
FIG. 2 is an illustration of a foam liner casting partially covered by an in-mold shell portion bonded to the liner.

Referring now to FIG. 2, an illustration of the in-mold shell portion 102 and liner 112 as viewed looking down on the exterior coronal area of the liner 112, is provided. It is to be appreciated that liner 112 is contoured in a shape suitable to be worn on the head. The in-mold shell portion 102 is shown bonded to the liner 112 at the top of the illustration. The in-mold shell portion 102 may be applied generally in the occipital and lower temporal areas, however, other areas of liner 112 may be covered by the in-mold shell portion 102. The in-mold portion 102 has been applied in a modification of the conventional in-mold method that only uses a partial shell.

The areas of the liner 112 not covered by the in-mold shell portion 102 are exposed foam and may be provided with a variety of features, including channels and through-bores. The in-mold method results in the absence of voids between the inner, major surface of the in-mold shell portion 102 and the outer, major surface of the liner 112. Accordingly, where ventilation between the shell and liner is desired, no in-mold shell portion has been provided. As seen in FIG. 2, the liner 112 includes channels 114, 116, 118, 120, 122, 124, 126, and 128 which may extend parallel to the major surface of the liner 112 from the frontal area to the upper occipital area. These channels may later form conduits for air when the post-applied shell portion is bonded to the liner 112 at a subsequent step. The liner 112 also includes through-bores that completely penetrate through the liner 112 thickness perpendicular to the major surface of the liner 112. Through-bores 130 and 132 are representative of the through-bores on both the right and left halves of the helmet 100. Through-bores are provided within the channels for a reason which is described below. Through-bores may also be provided outside the channels. The post-applied shell 104 of FIG. 1 can selectively cover some or all of the through-bores to provide ventilation through the post-applied shell 104 and liner 112 and also between the post-applied shell 104 and liner 112. Generally, through-bores not within a channel are provided for ventilation exclusively through the shell and liner, while through-bores in the channels are provided for ventilation through and between the shell and liner. The liner 112 may further includes ridges 134, 136, 138, 140, 142, and 144 between the channels. It is apparent that by applying the post-applied shell 104 that has a smooth interior major surface, conduits may be created from the channels in the liner 112 and the shell 104 that may extend from the frontal area to the occipital area of the helmet 100. It can be appreciated that some or all of the through-bores within the channels may be covered with the shell, thereby providing a mechanism for the transfer of heat from the head to the channels, so that the removal of heat can be effectuated by air flow within the channels. A center ridge 145 may be provided with elongated through-bores 146, 148. Through-bores 146, 148 do not lie in channels and therefore may be provided for ventilation through the thickness of the helmet 100. Liner 112 also may include recessed areas 150, 152, at the frontal area of the liner 112. The recessed area 150 leads into recessed channels 114, 116, 118, and 120; and the recessed area 152 leads into recessed channels 122, 124, 126, and 128. Recessed areas 150 and 152 provide a space to install opening and closing vent lids, of which vent lid 193 shown in FIG. 1, is representative. Channels may also terminate at the occipital area as recesses or depressions, so that vent fins can fit within the channels.

Figure 3:
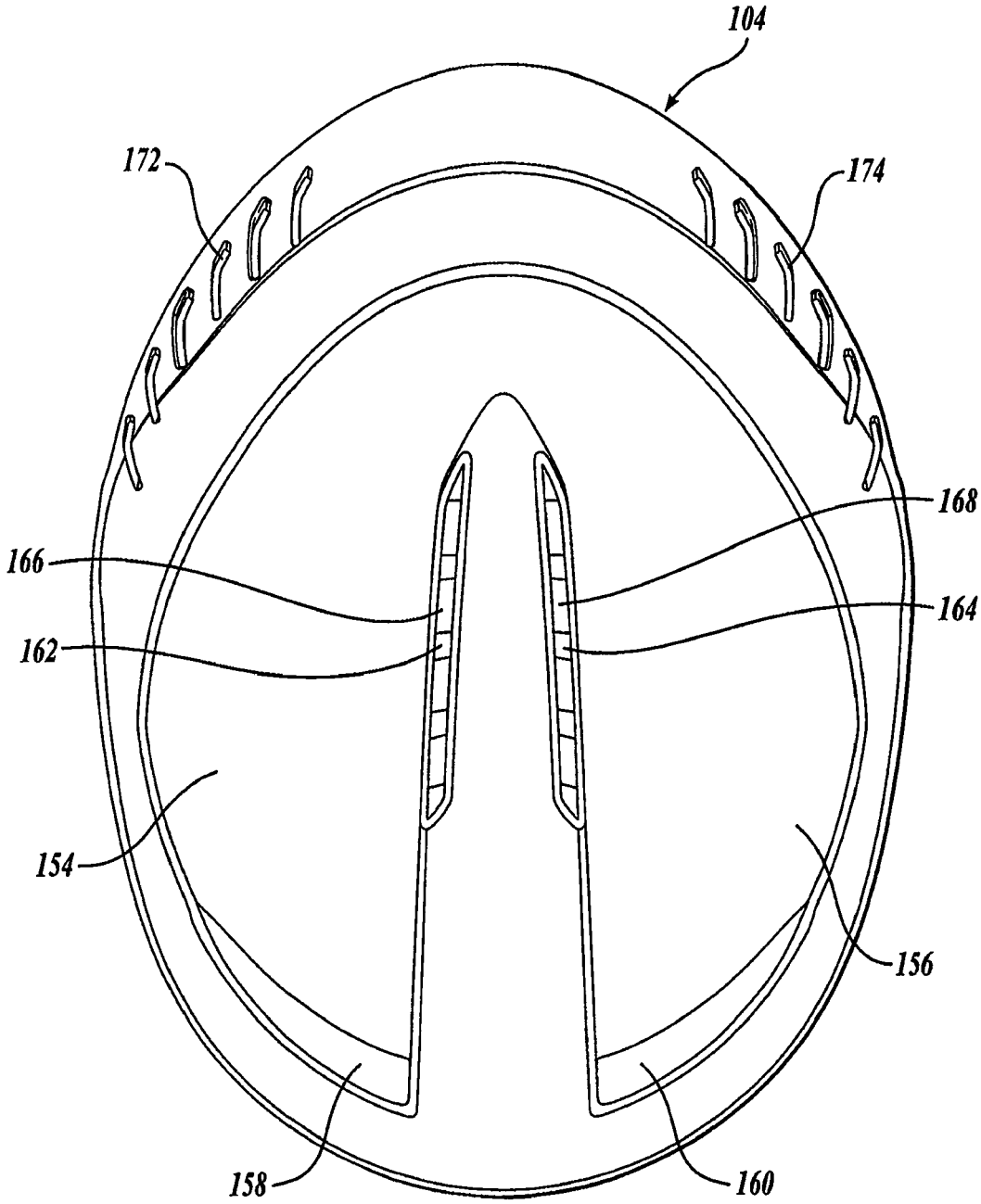
FIG. 3 is an illustration of a shell portion for post applying to the liner.

Referring now to FIG. 3, an illustration of the interior, major surface of the post-applied shell 104 that may be attached to the liner 112, is provided. It can be seen by comparison with FIG. 2 that the post-applied shell 104 does not have the exact contours that are provided in the liner 112. The post-applied shell 104 may be smooth in the areas, such as coronal areas 154, 156, where the shell 104 provides cover for the channels shown in FIG. 2. Post-applied shell 104 may also includes holes, such as holes 158, 160, at the frontal area of the shell 104, and pluralities of holes, such as holes 162, 164, at the coronal area of the shell 104. Frontal holes 158 and 160 are provided for fresh air entry, while holes, which are represented by holes 162, 164 are for heat exit. Pluralities of vent fins, such as vent fins 166, 168, are interposed between the holes at the coronal area, and are at an angle. The post-applied shell 104 includes pluralities of vent fins at the occipital area, of which vent fins 172, 174, are representative. Vent fins 172, 174, may project downward to lie in between the channels in the liner 112 shown in FIG. 2. Vent fins 172 are shown included in vents 195 in FIG. 1.

The post-applied shell 104 may define the entry points and exit points for air when the shell 104 is applied to the liner 112. Holes 158, 160 may be provided for air entry due to their placement at the frontal area where air impact is at its greatest, while vent fins 172 and 174 may lie at the air flow exit at the occipital area, when combined with liner 112 and in-mold shell portion 102. The post-applied shell 104 may provide cover for the areas that are not covered by the in-mold shell portion 102, excepting some overlap at the boundary region between the in-mold shell portion 102 and the post-applied shell portion 104 that creates an overhang 170 at the occipital area of the helmet 100 as seen in FIG. 1.

Figure 4:
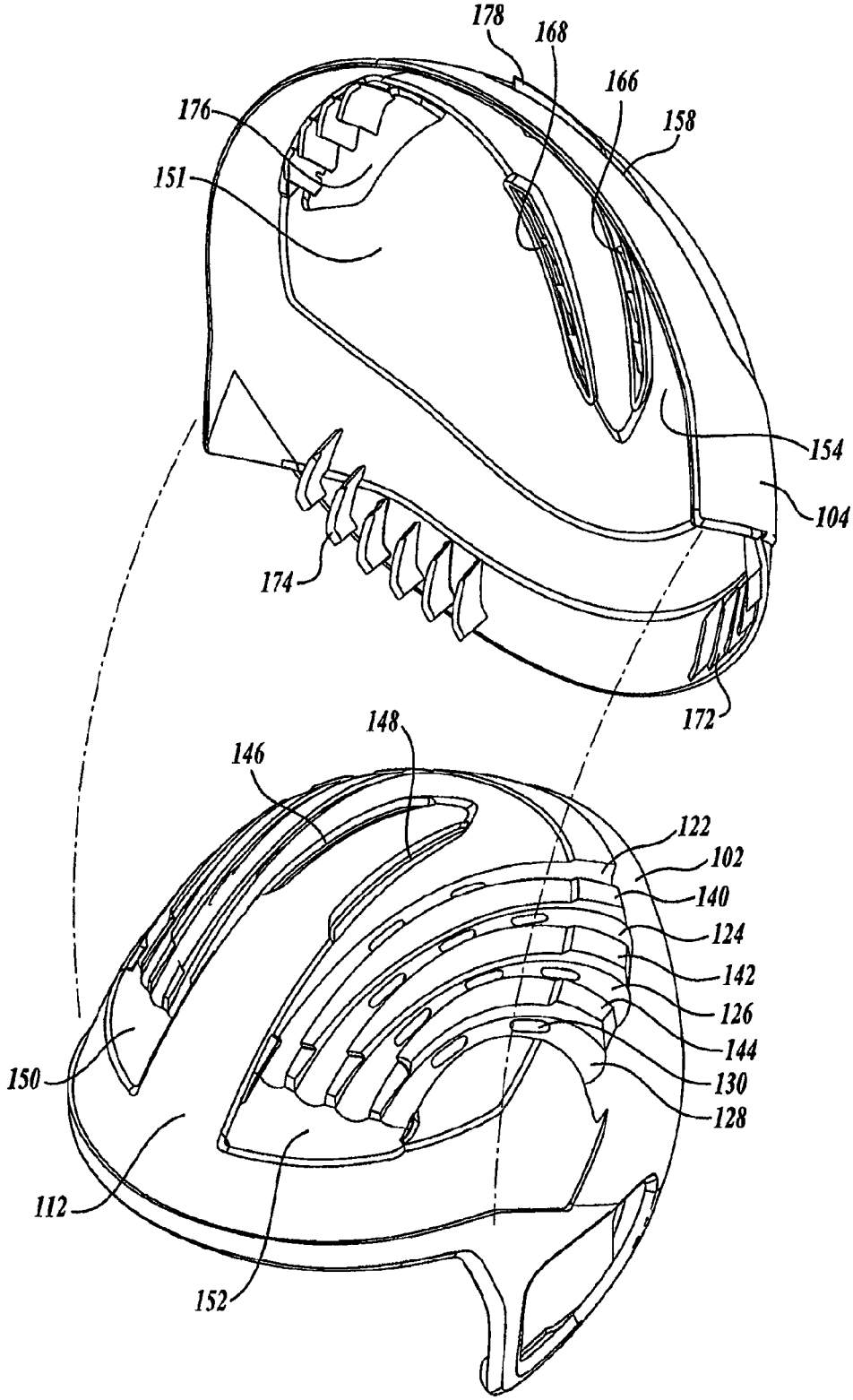
FIG. 4 is an illustration showing the joining of a foam liner with an in-mold shell portion to a post-applied shell portion.

Referring now to FIG. 4, an illustration showing the post-applied shell portion 104 being applied to the liner 112 with the in-mold shell portion 102, is provided. As seen in the illustration, the post-applied shell portion 104 may be constructed so that when applied to the liner 112, various features of the post-applied shell portion 104 cooperate with the features of the liner 112 to produce conduits for ventilation. For example, the smooth interior surfaces 154, 156 may come to rest adjacent and parallel to the raised ridges, of which 140, 142, and 144, are representative. Channels 122, 124, 126, and 128 are therefore covered by the smooth surface 156 to provide conduits for air flow between the liner 112 and post-applied shell 104. As can be seen in the illustration, through-bores, such as through-bore 130, may contribute to ventilation by allowing the passage of air and heat from the head into channels, such as channel 128. The air flow in the conduit formed from channel 128, for example, exits at the occipital area between the vent fins 172. Similar construction may be found on the opposite half of the helmet. Vent lids 176, 178 are shown adjacent to hole 158 and hole 160 that is covered by the vent lid 176 and therefore hole 160 is not shown. The vent lids 176 and 178 may fit within recesses 150 and 152 formed in the liner 112. Vent fins 172 and 174 located at the occipital area of the post-applied shell 104 are shown extending perpendicular to the interior, major surface of the post-applied shell 104. Vent fins 172, for example, are designed to fit within the channels 122, 124, 126, and 128, as shown in FIG. 2. Through-bores 146 and 148 at the coronal area of the liner 112 may be partially covered by the vent fins 166 and 168 located at the coronal area of the post-applied shell 104. It can be appreciated that heat and air rising through the through-bores 146 and 148 may escape from between the vent fins 166 and 168. It can also be appreciated that heat rising from the through-bore 130 may be carried away by the air entering from the hole 158, which then passes into the recess 152 and therefrom is distributed to the various channels, of which channel 128 is representative, and may exit at the occipital area of the helmet between the vent fins 172.

Figure 5:
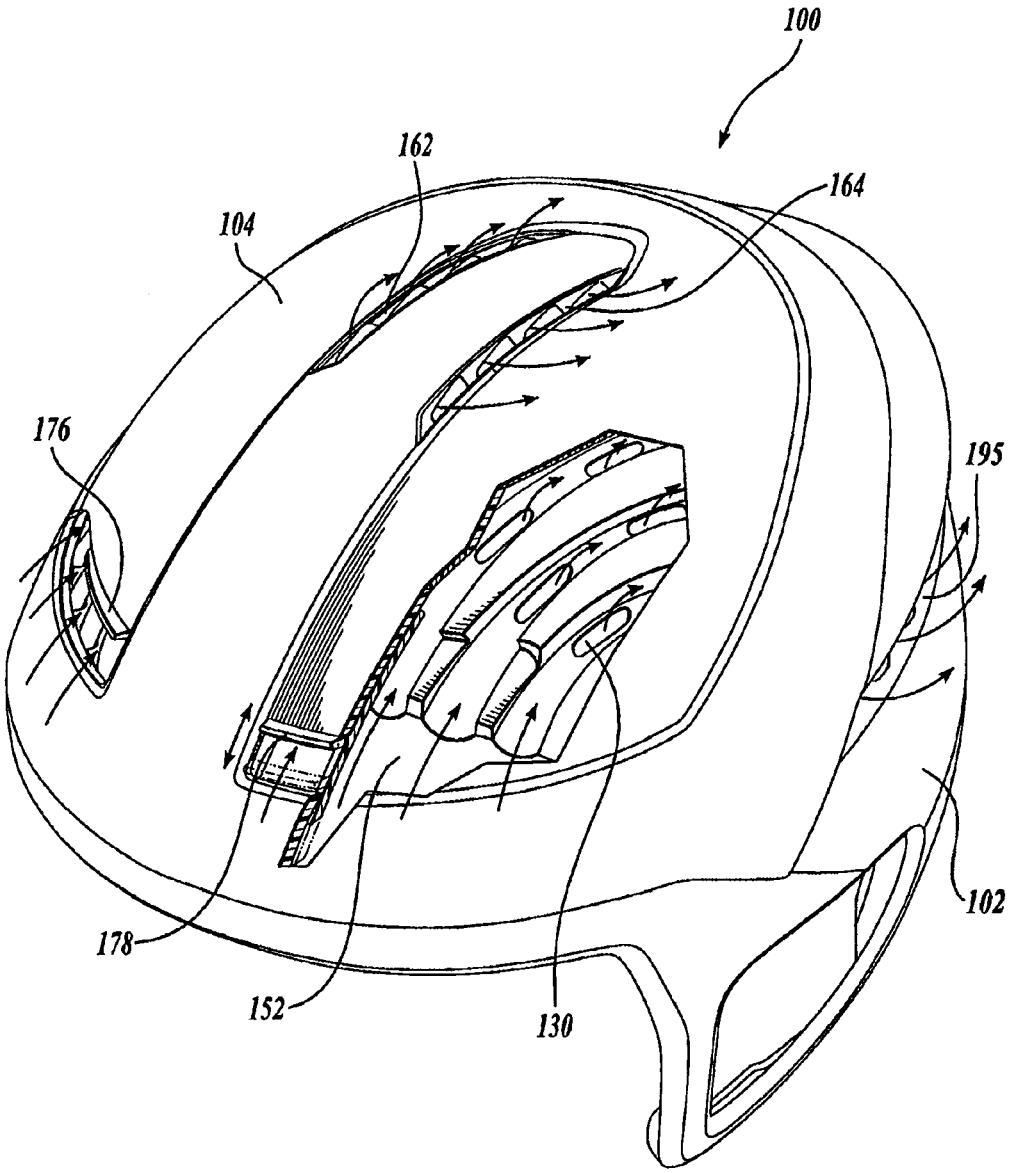
FIG. 5 is an illustration of the venting capabilities of a helmet having an in-mold shell portion and a post-applied shell portion.

Referring now to FIG. 5, an illustration diagramming various possible air flow paths through the post-applied shell portion 104 and the liner 112, is provided. Air and heat is diagrammed being carried away from the coronal area of the helmet 100 through hole 162 between coronal vent fins, such as vent fin 166, shown in FIG. 4. Such air and heat may pass through through-bore 148 of liner 112 shown in FIG. 4. The heat may be carried away by the air flowing over the exterior surface of the helmet 100. Outside air may enter through frontal holes 160 and 158 of the post-applied shell 104, shown in FIG. 3, in between the fins of vent lids 176 and 178 located at the frontal area of the helmet 100, shown in FIG. 4. Vent lids 176 and 178 can be moved up or down to permit or close off air flow. The air may then enter the recessed portions 150, 152 shown in the liner 112 in FIG. 4. The air may then enter one of the plurality of conduits formed from the channels of the liner 112 shown in FIG. 2. It can be appreciated that heated air rising through the through-bores at the channels, such as through-bore 130, can be carried away by the air flowing within the conduits formed from the channels. Heat and air exits the channels between the liner 112 and the post-applied shell 104 at the occipital area of the helmet 100 through vents on each side of the helmet 100, such as vent 195, as seen in FIG. 1. Accordingly, a helmet with an in-mold shell portion and a post-applied shell portion may have the advantage of a very stout shell to liner bond, with the added advantage of ventilation between the shell and the liner. Furthermore, in the method of making a helmet in accordance with the invention, an in-mold shell portion is provided in a mold, from which the liner is formed. The mold may be provided with any number of features to create channels and through-bores in the liner. After removal from the mold, the liner is glued to a post-applied shell otherwise attached to create air passages for ventilation between the liner and the post-applied shell. Furthermore, it can be appreciated that any of the exterior shell may be provided with detailing designed to provide an aerodynamic advantage and appeal to users.

While the preferred embodiment of the invention has been illustrated and described, it will be appreciated that various changes can be made therein without departing from the spirit and scope of the invention.

The invention claimed is:

1. A helmet, comprising:

a *foam* liner having a first generally concave major side and a second generally convex major side;

an in-mold *hard* shell having a first generally concave major side and a second generally convex major side, wherein the generally concave major side of the in-mold shell is disposed on *and bonded to* the surface at the generally convex major side of the *foam* liner *and partially covers the generally convex major side of the foam liner*; and a post-applied *hard* shell *defined by a single layer of material, the post-applied hard shell having a first generally concave major side and a second generally convex major side, wherein the generally concave major side of the post-applied hard shell is* disposed on the generally convex major side of the *foam* liner *and a portion of the generally concave major side of the post-applied hard shell is adjacent to and covers a portion of the generally convex major side of the foam liner not covered by the in-mold hard shell*.

2. The helmet of claim 1, wherein the in-mold shell is located at an occipital area of the helmet.

3. The helmet of claim 1, wherein the in-mold shell [comprises] *is* polycarbonate.

4. The helmet of claim 1, wherein the post-applied shell is located at a frontal, temporal, or coronal area of the helmet.

5. The helmet of claim 1, wherein the post-applied shell [comprises] *is* poly(acrylonitrile-butyl-styrene).

6. The helmet of claim 1, comprising at least one conduit for air flow, wherein the conduit is formed from the liner and the post-applied shell.

7. The helmet of claim 1, comprising at least one through-bore in the liner that is in communication with a conduit, wherein the conduit is formed from the liner and the post-applied shell.

8. The helmet of claim 1, comprising at least one conduit for air flow between the liner and the post-applied shell, wherein the conduit has an entry point for air at the frontal area of the helmet and has an exit point for air at the occipital area of the helmet.

9. The helmet of claim 1, comprising an entry point for air at the frontal area of the helmet, wherein the entry point can be closed by a vent lid.

10. The helmet of claim 1, comprising at least one through-bore in the liner that has a corresponding hole in the post-applied shell at the coronal area of the helmet.

11. The helmet of claim 1, comprising at least one post at the temporal area on both sides of the helmet for attachment to eyewear.

12. The helmet of claim 1, comprising at least one of a chin strap, ear muff, plastic trim piece or interior helmet padding.

13. The helmet of claim 1, wherein the liner comprises polystyrene foam.

14. A helmet, comprising:

a *foam* liner having a first generally concave major side and a second generally convex major side;

a first in-mold *hard* shell having a first generally concave major side and a second generally convex major side, wherein the generally concave major side of the in-mold shell is disposed on *and bonded to* the surface at the generally convex major side of the *foam* liner *and partially covers the generally convex major side of the foam liner* without providing spaces for air flow between the liner and the first shell; and a second post-applied *hard* shell *defined by a single layer of material, the post-applied hard shell having a first generally concave major side and a second generally convex major side, wherein the generally concave major side of the post-applied hard shell is* disposed on the generally convex major side of the *foam* liner *and a portion of the generally concave major side of the post-applied hard shell is adjacent to and covers a portion of the generally convex major side of the foam liner not covered by the in-mold hard shell* and [providing] *provides* spaces for air flow *formed* between the *generally convex major side of the foam* liner and the *generally concave major side of the* second *hard* shell.

15. The helmet of claim 14, wherein the liner comprises through-bores and channels from the front to the back of the liner.

16. The helmet of claim 15, wherein the second post-applied shell is applied over the channels in the liner to create passages for air flow from the front of the helmet to the back of the helmet.

17. The helmet of claim 15, wherein the second post-applied shell includes a vent that corresponds with the through-bores in the liner.

18. The helmet of claim 14, wherein the first shell covers an occipital area of the liner, and the second shell covers at least one of the frontal, temporal, or coronal areas of the liner.

*19. A helmet, comprising:*

*a foam liner having a first generally concave major side and a second generally convex major side, wherein the foam liner defines occipital, coronal, temporal, and frontal areas on the generally convex major side;*

*an in-mold hard shell having a first generally concave major side and a second generally convex major side, wherein the generally concave major side of the in-mold shell is disposed on and bonded to the generally convex major side of the foam liner at one of the occipital, coronal, or temporal areas and provides exposed foam at the frontal area of the foam liner; and*

*a post-applied hard shell defined by a single layer of material, the post-applied hard shell having a first generally concave major side and a second generally convex major side, wherein the generally concave major side of the post-applied hard shell is disposed on the generally convex major side of the foam liner and a portion of the generally concave major side of the post-applied hard shell is adjacent to and extends over the exposed foam on the frontal area of the foam liner.*

*20. A helmet, comprising:*

*a foam liner having a first generally concave major side and a second generally convex major side;*

*an in-mold hard shell having a first generally concave major side and a second generally convex major side, wherein the generally concave major side of the in-mold shell is disposed on and bonded to the surface of the generally convex major side of the foam liner and partially covers the generally convex major side of the foam liner; and*

*a post-applied hard shell defined by a single layer of material, the post-applied hard shell having a first generally concave major side and a second generally convex major side, wherein the generally concave major side of the post-applied hard shell is disposed on the generally convex major side of the liner and a portion of the generally concave major side of the post-applied hard shell is adjacent to and covers a portion of the foam liner not covered by the in-mold hard shell, wherein the post-applied hard shell includes a plurality of downwardly projecting vent fins at an occipital area of the hard shell.*

*21. The helmet of claim 1, wherein the post-applied hard shell is a poly(acrylonitrile-butyl-styrene) monolithic material.*

*22. The helmet of claim 14, wherein the post-applied hard shell is a poly(acrylonitrile-butyl-styrene) monolithic material.*

*23. The helmet of claim 19, wherein the post-applied hard shell is a poly(acrylonitrile-butyl-styrene) monolithic material.*

*24. The helmet of claim 20, wherein the post-applied hard shell is a poly(acrylonitrile-butyl-styrene) monolithic material.*

*25. The helmet of claim 1, wherein the post-applied hard shell comprises more than one portion, each portion being a single layer thick, and each portion is separate and attached to a distinct area of the liner.*

*26. The helmet of claim 14, wherein the post-applied hard shell comprises more than one portion, each portion being a single layer thick, and each portion is separate and attached to a distinct area of the liner.*

*27. The helmet of claim 19, wherein the post-applied hard shell comprises more than one portion, each portion being a single layer thick, and each portion is separate and attached to a distinct area of the liner.*

*28. The helmet of claim 20, wherein the post-applied hard shell comprises more than one portion, each portion being a single layer thick, and each portion is separate and attached to a distinct area of the liner.*

* * * * *